United States Patent
Rose et al.

(10) Patent No.: US 7,077,429 B2
(45) Date of Patent: Jul. 18, 2006

(54) INFLATABLE CUSHION WITH SHIELDED SEAMS

(75) Inventors: Larry D. Rose, South Weber, UT (US); Trudy C. Lewis, West Haven, UT (US); Marc P. Russell, Plain City, UT (US); Shyam S. V. Kuppurathanam, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 292 days.

(21) Appl. No.: 10/732,101

(22) Filed: Dec. 10, 2003

(65) Prior Publication Data

US 2005/0127650 A1 Jun. 16, 2005

(51) Int. Cl.
B60R 21/16 (2006.01)
(52) U.S. Cl. .................................. 280/743.1
(58) Field of Classification Search ............. 280/743.1, 280/728.1
See application file for complete search history.

(56) References Cited

U.S. PATENT DOCUMENTS

| | | | |
|---|---|---|---|
| 3,807,754 A | 4/1974 | Rodenbach et al. | |
| 5,100,168 A | 3/1992 | Horiuchi et al. | |
| 5,114,180 A | 5/1992 | Kami et al. | |
| 5,421,610 A | 6/1995 | Kavanaugh et al. | |
| 5,470,101 A | 11/1995 | Ennis | |
| 5,630,620 A | 5/1997 | Hirai et al. | |
| 5,755,457 A * | 5/1998 | Specht ................. | 280/728.2 |
| 5,884,937 A | 3/1999 | Yamada | |
| 6,155,596 A | 12/2000 | Nakajima et al. | |
| 6,176,514 B1 | 1/2001 | Einsiedel | |
| 6,220,629 B1 | 4/2001 | Wipasuramonton et al. | |
| 6,244,619 B1 | 6/2001 | Satzger | |
| 6,299,965 B1 | 10/2001 | Keshavaraj | |
| 6,328,334 B1 | 12/2001 | Kanuma | |
| 6,355,123 B1 | 3/2002 | Baker et al. | |
| 6,371,512 B1 * | 4/2002 | Asano et al. ............ | 280/730.2 |
| 6,435,553 B1 | 8/2002 | Wipasuramonton et al. | |
| 6,550,809 B1 | 4/2003 | Masuda et al. | |
| 2002/0195808 A1 | 12/2002 | Chiou et al. | |

FOREIGN PATENT DOCUMENTS

| | | |
|---|---|---|
| DE | 197 43 626 | 4/1998 |
| EP | 0847904 A1 | 6/1998 |
| EP | 1 044 854 A2 | 10/2000 |
| GB | 2 389 822 A | 12/2003 |
| JP | 2-237837 | 9/1990 |
| JP | 4-356249 | 12/1992 |
| WO | WO 01/36184 | 5/2001 |

\* cited by examiner

Primary Examiner—Faye M. Fleming
(74) Attorney, Agent, or Firm—Sally J Brown

(57) ABSTRACT

The inflatable cushion of the present invention includes at least two panels and one or more heat shield strips. Each panel has an inflatable region, an attachment region, and a peripheral edge. The attachment region is positioned between the peripheral edge and the inflatable region of each panel. An inward fold is disposed between the inflatable region and the attachment region of each panel. The attachment regions of each panel are disposed proximate each other. A heat shield strip is disposed on a portion of the attachment region and the inflatable region of the same panel. A secure fastener secures the attachment regions of each adjacent panel together and secures the heat shield strip to the attachment region on which it is disposed. A frangible fastener secures the heat shield strip to the adjacent inflatable region on which it is positioned.

33 Claims, 3 Drawing Sheets

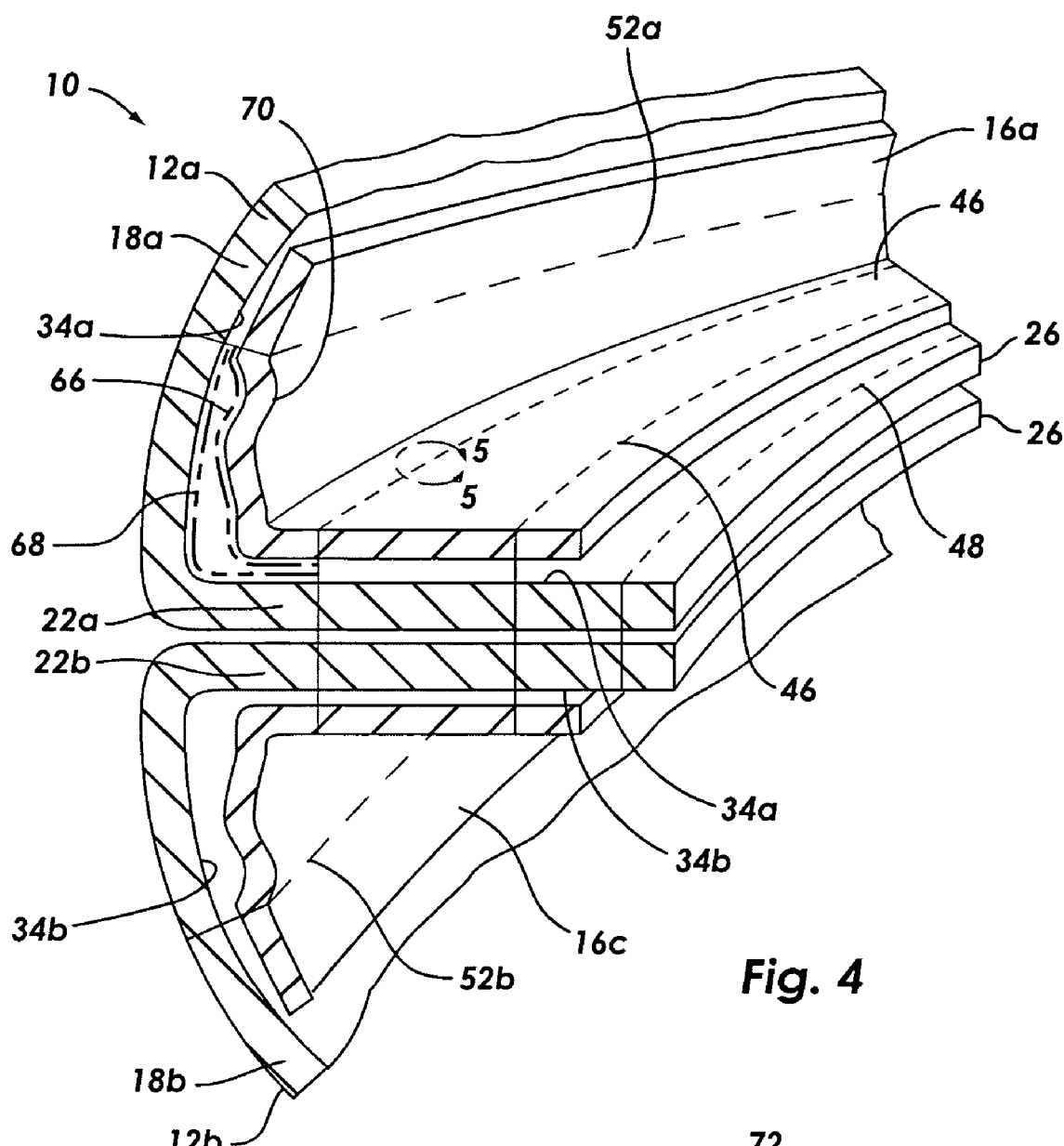
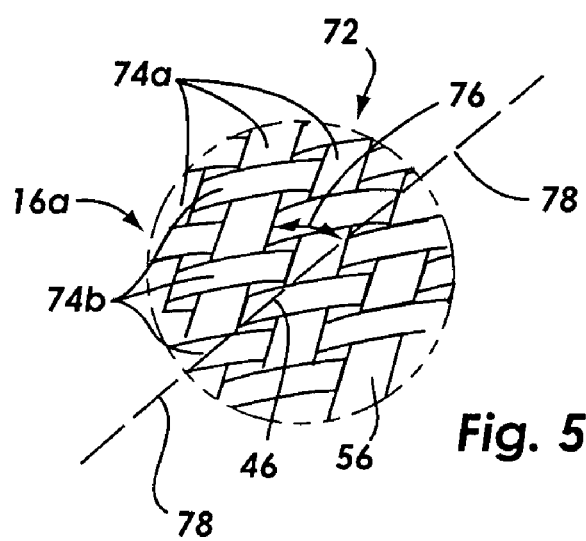
Fig. 4
Fig. 5

INFLATABLE CUSHION WITH SHIELDED SEAMS

BACKGROUND OF THE INVENTION

1. Field of the Invention

The present invention relates to an inflatable cushion. More specifically, this invention relates to an inflatable cushion having shielded seams.

2. Description of Related Art

Inflatable airbags are well accepted for use in motor vehicles and have been credited with preventing numerous deaths and injuries. Some statistics estimate that frontal airbags reduce the fatalities in head-on collisions by 25% among drivers using seat belts and by more than 30% among unbelted drivers. Statistics further suggest that with a combination of a seat belt and an airbag, serious chest injuries in frontal collisions can be reduced by 65% and serious head injuries by up to 75%. Airbag use presents clear benefits and vehicle owners are frequently willing to pay the added expense for airbags. In addition, the inclusion of inflatable safety restraint devices, or airbags, is now a legal requirement for many new vehicles.

Airbag systems typically include three principal components: an electronic control unit (ECU), an inflator, and an inflatable cushion. The ECU monitors the acceleration and deceleration of the vehicle and determines when accident conditions exist. The ECU is in communication with the inflator and transmits a signal to the inflator when the ECU determines that the vehicle has been involved in an accident.

In response to receipt of the signal, the inflator generates inflation gas. The inflator can be designed to produce inflation gas using various methods. For instance, the inflator may use pyrotechnic techniques or simply release compressed gas. In addition, the inflator may use a combination of both pyrotechnics and compressed gas to produce pressurized inflation gas. The inflator is in fluid communication with the inflatable cushion.

The inflatable cushion receives the gas generated by the inflator and rapidly expands as the gas fills the cushion. The inflatable cushion is made from a flexible material, such as fabric. When expanded, the cushion is positioned to prevent the occupant from striking hard surfaces within the vehicle, such as the steering wheel, dashboard, or windshield. The inflated cushion receives the energy of an occupant impact and dissipates the energy such that injuries are minimized or avoided. If the occupant is using a seat belt, airbags also assist in retaining the vehicle occupant within the seat belt and minimize the risk of ejection from the vehicle.

The most common type of airbag system stores the cushion and inflator in a compartment in the steering wheel. This type of airbag system is frequently referred to as a driver's side airbag system. When the vehicle is involved in an accident, the cushion receives the gas generated by the inflator, expands, and is propelled out of the compartment in the steering wheel. The cushion is fully inflated in a fraction of a second. The inflated cushion prevents the driver from striking the steering wheel and dissipates the kinetic energy of the occupant to minimize injury to the occupant. Similar airbag systems are frequently installed in the passenger's side of the dashboard.

More recently, inflatable curtains have been used to protect vehicle occupants. Prior to deployment, inflatable curtains are generally stored in a compartment located above the side doors of the vehicle. When inflation gas is injected into the curtain, the curtain deploys in a downward direction to prevent the occupant from striking the side windows or doors of the vehicle during an accident.

Other types of airbag systems are currently in development or use. For example, a knee bolster airbag system is generally positioned below the dashboard in a passenger vehicle in a stowed condition and deploys to protect an occupant's lower extremities and knees.

Regardless of the type of airbag in use, the inflatable cushion in use must expand rapidly to provide the desired protection to a vehicle occupant in an accident. This rapid expansion places significant structural stress on the cushion during the inflation process. The elevated temperature of gas injected into the cushion, coupled with the structural stress placed on the cushion during inflation, can result in cushion deterioration. Moreover, in recent times, the gas temperature of new inflator technologies has generally increased.

Cushion seams, where panels of the cushion are sewn or otherwise secured together, are particularly vulnerable to damage during the inflation process. It has been observed that as a cushion is pressurized, the woven yarns of the fabric pull away from each other at points where the sewn threads pass through the fabric, allowing hot gas to erode the fabric yarns. This type of cushion deterioration is often referred to as seam "combing."

Many different systems have been implemented in an attempt to address this problem. For example, cushion fabrics have been treated with a heat-resistant coating, such as silicone or urethane. Unfortunately, coating the cushion fabric is expensive and time consuming. Other cushion heat-shielding systems have also been developed. However, these systems are generally complex and require significant time to install in the cushions.

Accordingly, there is a need in the art for an inflatable cushion that addresses one or more of the above-listed problems. Such a cushion is disclosed herein.

SUMMARY OF THE INVENTION

The apparatus of the present invention has been developed in response to the present state of the art, and in particular, in response to problems and needs in the art that have not yet been fully resolved by currently available inflatable cushions. The inflatable cushion of the present invention resolves these concerns in a cost-effective manner and involves a simple manufacturing process.

The inflatable cushion of the present invention includes at least two panels and one or more heat shield strips. The panels are secured together, and the cushion thus includes at least one seam, where the panels meet. The heat shield strips are positioned over portions of the panels adjacent the seams and protect those regions from heat-related damage during the inflation of the cushion.

Each panel has an inflatable region, an attachment region, and a peripheral edge. The inflatable region of each panel is that portion of the panel that expands in response to receipt of the inflation gas in the cushion. The attachment region is positioned between the peripheral edge and the inflation region of each panel. The attachment region of each panel is secured to the attachment region of an adjacent panel. An inward fold is disposed between the inflatable region and the attachment region of each panel.

The panels are made from a flexible material, such as a woven fabric. For example, the panels may be made from a polymer-based material, such as nylon. In one embodiment, the panels are made from a woven fabric that is devoid of a heat-resistant coating.

The panels may be used to make different types of cushions, such as a driver's side cushion, an inflatable curtain, or a knee bolster inflatable cushion. As a result, the panels vary in number, size, and shape depending on the type of cushion in use.

One of the panels has an opening for receiving an inflator. Alternatively, the inflator may be remotely positioned relative to the cushion and thus an opening in one of the panels is shaped to receive a gas guide that places the cushion and inflator in fluid communication.

The heat shield strips may be embodied in various shapes, such as an elongated rectangular shape or a curved elongated shape. Varying numbers of heat shield strips may be used within the scope of this invention.

The heat shield strips, like the panels, may be made from a woven fabric or other type of flexible material. In one embodiment, the heat shield strips are made from a lightweight woven material. The heat shield strips optionally include a heat-resistant coating.

The heat shield strips are positioned over portions of the attachment regions and inflatable regions to shield these areas from heat-related damage during inflation of the cushion. More specifically, where a first and a second panel meet, a first heat shield strip is disposed on an interior surface of the attachment region of the first panel, and a second heat shield strip is disposed on an interior surface of the attachment region of the second panel. In one embodiment, the first heat shield strip is free of contact with the second panel, and the second heat shield strip is free of contact with the first panel.

A first secure fastener is used to secure the attachment regions of the first and second panels between the first and second heat shield strips. Thus, the first secure fastener also secures the adjoining attachment regions together. The secure fastener may be embodied as one or more sets of secure stitches. Alternatively, the secure fastener may include an adhesive, a clip, pin, rivet, or other type of mechanical fastener. The secure fastener must be strong and is designed to secure the panels and heat shield strips together before, during, and after inflation of the cushion.

At a given seam, where the first and second panels meet, the first heat shield strip is also disposed on a portion of the interior surface of the inflatable region of the first panel. The second heat shield strip is disposed on a portion of the interior surface of the inflatable region of the second panel.

A first frangible fastener secures the first heat shield strip to the inflatable region of the first panel, and a second frangible fastener secures the second heat shield strip to the inflatable region of the second panel. The frangible fasteners may be embodied as a set of frangible stitches. In one embodiment, the set of frangible stitches has less than 25 stitches per 100 mm and/or has thread no greater than thread size 92. Of course, alternative types of frangible fasteners may be used, such as weak adhesives, clips, or pins.

The frangible fastener is designed to break upon the application of a predetermined force. Thus, the frangible fastener will break rather than applying stress or force to the inflatable regions of the panels during inflation of the cushion. If a secure fastener were used to secure the heat shield strips to the inflatable regions of the cushion, force could be applied to the inflatable regions during inflation of the cushion, which may result in combing or damage to the panels. Thus, the use of frangible fasteners in the present invention provides substantial advantages over the prior art in that the heat shield strips are held in place while the risk of damage to the cushion during the inflation process is minimized.

In an alternative embodiment of the present invention, the first or second heat shield may be omitted at a particular seam. In such an embodiment, only one of the attachment regions at a given seam is shielded.

The inflatable cushion of the present invention is made in the following manner. A first heat shield strip is secured to the interior surface of the inflatable region of a first panel using a first frangible fastener. A second heat shield strip is optionally secured to the interior surface of the inflatable region of a second panel using a second frangible fastener.

The attachment region of the first panel and the attachment region of the second panel are secured between the first and second heat shield strips using a secure fastener. This process is repeated for each seam in the cushion and is more easily performed when the cushion is in an inside out configuration. Accordingly, following attachment of the panels together, the cushion may be pulled through an opening in the cushion to invert the cushion to its correct orientation.

The inflatable cushion of the present invention thus provides substantial advantages over conventional cushions. Through use of simple, inexpensive heat shield strips, key portions of the panels are protected from heat-related damage during inflation of the cushion. The heat shield strips are secured to the attachment regions of the cushion using a secure fastener and to inflatable region using a frangible fastener. As a result, the heat shield strips protect areas of the cushion adjacent to the seam from "combing" or other heat-related damage and avoid applying potentially damaging force or pressure to the inflatable region of the cushion.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which:

FIG. 4 is a cross-sectional view of the inflatable cushion shown in FIG. 3 taken across the line 3—3; and FIG. 5 is an enlarged sectional view of the inflatable cushion shown in FIG. 4 taken along the line 5—5.

DETAILED DESCRIPTION OF THE PREFERRED EMBODIMENTS

The preferred embodiments of the invention are now described with reference to FIGS. 1–5 wherein like parts are designated by like numerals throughout. The members of the present invention, as generally described and illustrated in the Figures, may be designed in a wide variety of configurations. Thus, the following more detailed description of the embodiments of the present invention, as represented in the Figures, is not intended to limit the scope of the invention, as claimed, but is merely representative of presently preferred embodiments of the invention.

In this application, the phrases "connected to," "coupled to," and "in communication with" refer to any form of interaction between two or more entities, including mechanical, electrical, magnetic, electromagnetic, electromechanical and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "directly attached to" refers to a form of attachment by which the attached items are either in direct contact, or are only separated by a single connector, adhesive, or other attachment mechanism. The term "abutting" refers to items that are in direct physical contact with each other, although the items may not be attached together.

Figure 1:
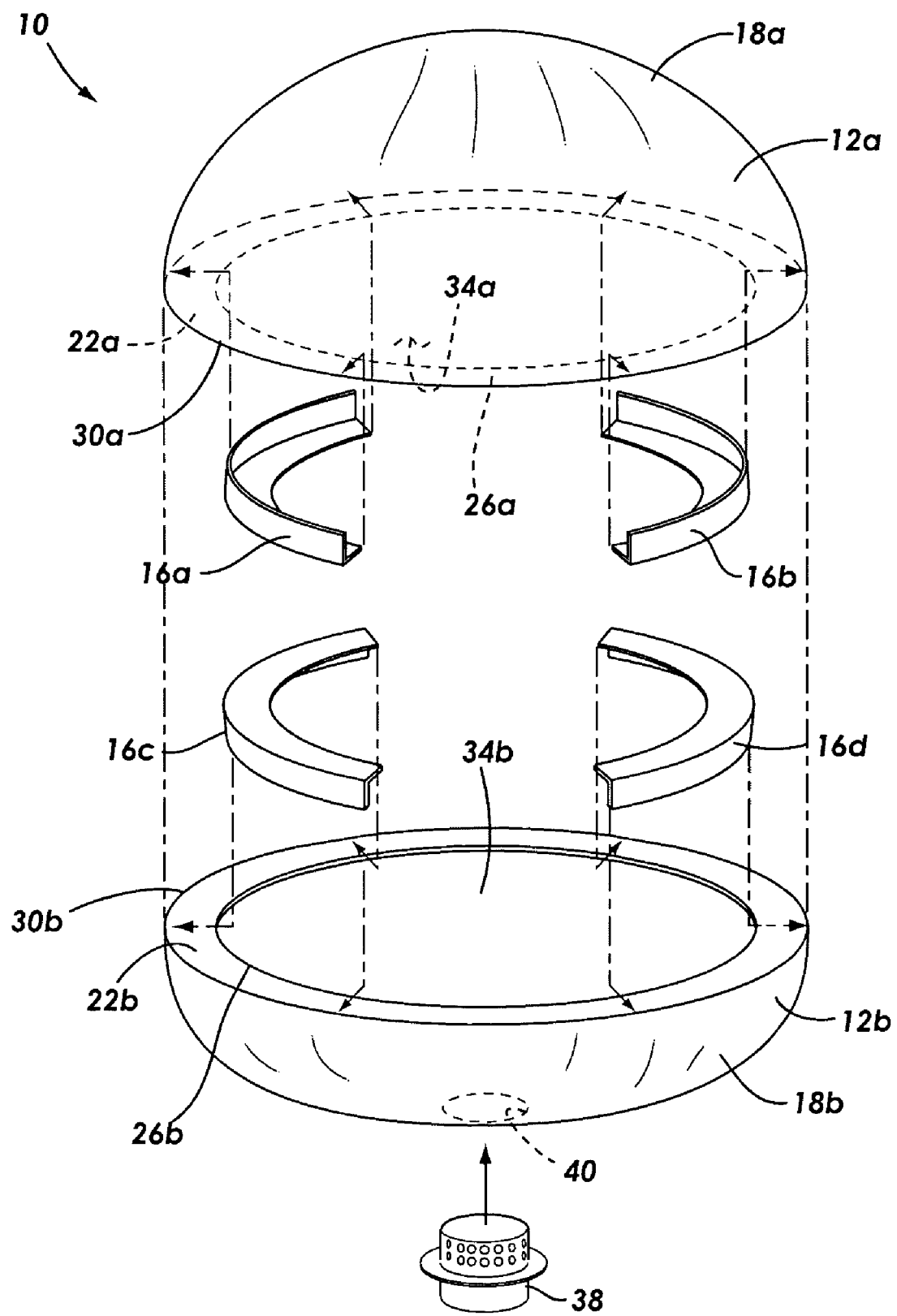
FIG. 1 is an exploded view of an embodiment of the inflatable cushion of the present invention.

FIG. 1 is an exploded view of one embodiment of the inflatable cushion 10 of the present invention. The inflatable cushion 10 of the present invention includes at least two panels 12a–b and one or more heat shield strips 16a–d.

Each panel 12a–b has an inflatable region 18a–b, an attachment region 22a–b, and a peripheral edge 26a–b. The inflatable region 18 of each panel 12 is that portion of the panel 12 that expands in response to receipt of the inflation gas in the cushion 10. The attachment region 22 is positioned between the peripheral edge 26 and the inflatable region 18 of each panel 12. The attachment region 22 of each panel 12 is used to secure the panels 12 together. An inward fold 30a–b is disposed between the inflatable region 18 and the attachment region 22 of each panel 12.

The panels 12 are made from a flexible material, such as a woven fabric. For example, the panels 12 may be made from a polymer-based material, such as nylon. In one embodiment, the panels 12 are made from a woven fabric that is devoid of a heat-resistant coating.

The cushion 10 illustrated in FIG. 1 includes four heat shield strips 16a–d. The heat shield strips 16, like the panels 12, may be made from a woven fabric or other type of flexible material. In one embodiment, the heat shield strips 16 are made from a light-weight woven material. The heat shield strips 16 optionally include a heat-resistant coating.

The heat shield strips 16 may be embodied in a number of different shapes, such as rectangular elongated shape, or a curved elongated shape. In addition, varying numbers of heat shield strips 16 may be used within the scope of this invention.

When the cushion 10 is assembled, the heat shield strips 16 are positioned on interior surfaces 34a–b of the panels 12 as shown by the arrows in FIG. 1. More specifically, the heat shield strips 16 are positioned over portions of the attachment regions 22 and inflatable regions 18 to shield these areas from heat-related damage during inflation of the cushion 10. In FIG. 1, the heat shield strips 16 are shown in a folded condition to illustrate the shape of the strips 16 when they are positioned within the panels 12.

An inflator 38 for generating pressurized gas is also depicted in this figure. Inflators 38 of various types can be used with the cushion 10 of the present invention. The inflator 38, for example, may release compressed gas into the cushion 10. Alternatively, the inflator 38 employs pyrotechnic techniques or a combination of both compressed gas and pyrotechnic techniques to generate pressurized gas to inflate the cushion 10.

When assembled, the inflator 38 may be secured within an opening 40 in the cushion 10. Alternatively, the cushion 10 is remotely situated with respect to the cushion 10 and in fluid communication with the cushion 10.

Figure 2:
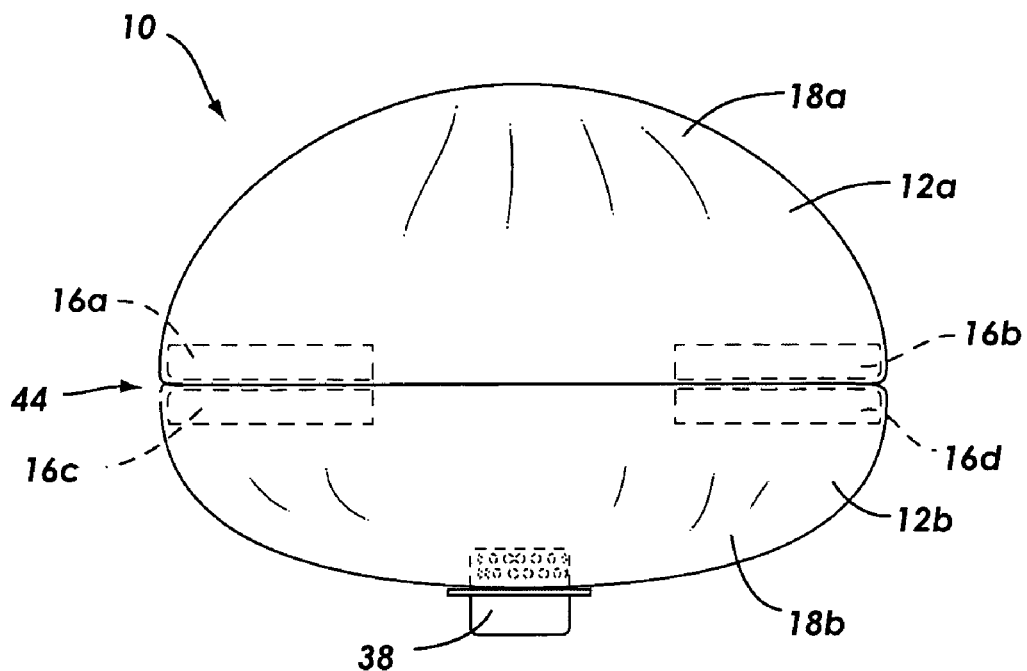
FIG. 2 is a side view of the inflatable cushion of FIG. 1 shown in an inflated condition.

FIG. 2 is a side view of the embodiment of the inflatable cushion 10 illustrated in FIG. 1. The cushion 10 of FIG. 2 is shown in an inflated condition and includes a shielded seam 44. The illustrated cushion 10 is a driver's side cushion 10 that deploys from a steering wheel of a vehicle (not shown). However, the shielded seam 44 of the present invention may be used with a number of different types of cushions 10, such as an inflatable curtain, a knee bolster cushion, or a passenger's side airbag (not shown).

As noted above, the depicted cushion 10 includes a first and a second panel 12a–b. The attachment regions 22a–b (shown in FIG. 1) of first and second panels 12a–b are secured together to form the cushion 10. The seam 44 is disposed between the first and second panels 12a–b.

One or more heat shield strips 16a–d, which are shown in phantom in FIG. 2, are disposed on the attachment regions 22a–b and inflatable regions 18a–b of the panels 12. During inflation of the cushion 10, the attachment regions 22 of each of the panels 12 are placed under significant structural stress. Without the heat shield strips 16, a combination of this stress and the heat generated by the inflator could damage the panels 12. The heat shield strips 16 shield, or insulate, portions of the panels 12 from the heat generated by the inflator 38 during inflation of the cushion 10 and thus enhance the structural integrity of the cushion 10. Because heat shield strips 16 are used, a heat-resistant coating is not needed to protect the panels 12. As a result, the cost of the cushion 10 is significantly diminished.

Figure 3:
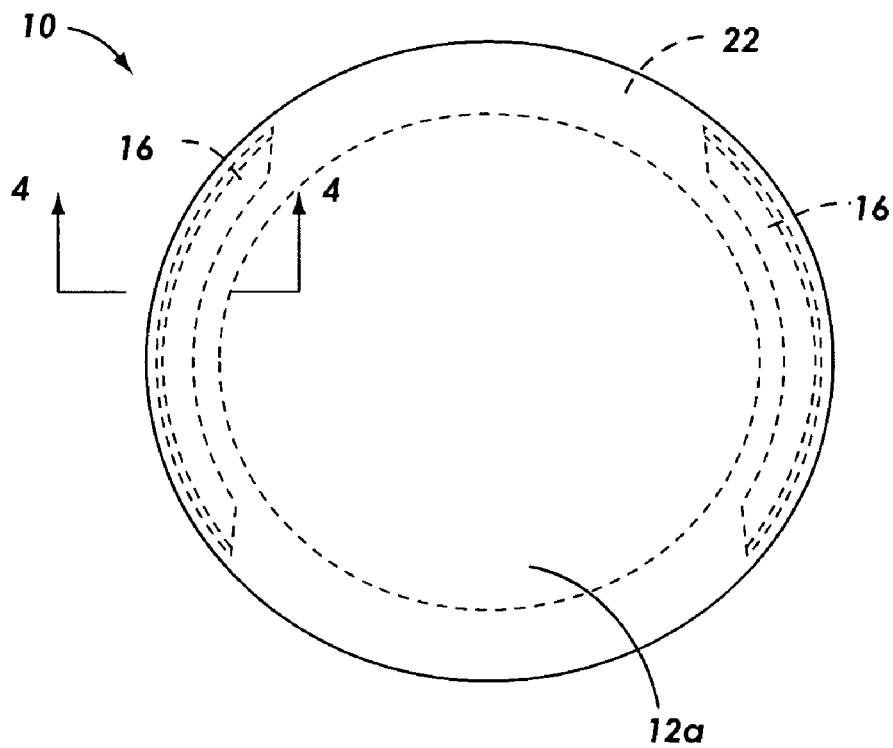
FIG. 3 is a top view of the inflatable cushion of FIG. 2.

Referring now to FIG. 3, there is shown a top view of the embodiment of the inflatable cushion 10 shown in FIG. 2. As indicated above, attachment regions 22 of the panels 12 are secured to together. Because FIG. 2 is a top view, only one of the panels 12a is shown.

The heat shield strips 16 of the depicted embodiment are selectively disposed on portions of the attachment region 22 of each panel 12. The heat shield strips 16 may be positioned at various locations on the attachment regions 22, depending, for example, on the structure and shape of the cushion 10 and the position of the inflator 38 (shown in FIG. 2) relative to the cushion 10. In the illustrated embodiment, only portions of the attachment region 22 are covered with heat shield strips 16. Alternatively, the heat shield strips 16 may be disposed only on portions of the attachment regions 22 facing the inflator 38. In an another embodiment, a heat shield strip 16 or a number of strips 16 may be positioned over the entire attachment region 22 of each panel 12.

FIG. 4 is a cross-sectional view of the inflatable cushion 10 of FIG. 3 taken across the line 3—3. In this figure, the first and second panel 12a–b are illustrated together with a first and second heat shield strip 16a, 16c. As indicated above, each panel 12 includes a peripheral edge 26, an attachment region 22, and an inflatable region 18. The attachment regions 22 of each panel 12 are disposed proximate each other.

The first heat shield strip 16a is disposed on the interior surface 34a of the attachment region 22a of the first panel 12a and shields the interior surface 34a from heated inflation gas during the inflation process. The second heat shield strip 16c is disposed on an interior surface 34b of the attachment region 22b of the second panel 12b.

A first secure fastener 46 is used to secure the attachment regions 22 of the first and second panels 12a–b between the first and second heat shield strips 16a, 16c. Thus, the first secure fastener 46 also secures the attachment regions 22 together. The first secure fastener 46 may be embodied as one or more sets of secure stitches 46, as illustrated in FIG. 4. Alternatively, the secure fastener 46 may be embodied as an adhesive, a clip, pin, rivet or other type of mechanical fastener. The secure fastener 46 must be strong and is designed to secure the panels 12 and heat shield strips 16 together before, during, and after inflation of the cushion 10.

The cushion 10 optionally includes a second secure fastener 48 that secures only the attachment regions 22 of the first and second panels 12a–b together. The second secure fastener is not used to secure either of the heat shield strips 16a, 16c to a panel 12. The second secure fastener 48 may be embodied as a set of secure stitches 48, as shown, or as any other type of secure mechanical fastener.

The first heat shield strip 16a is also disposed on the interior surface 34a of the inflatable region 18a of the first panel 12a, while the second heat shield strip 16c is disposed on the interior surface 34b of the inflatable region 18b of the second panel 12b. As shown, the first heat shield strip 16a is free of contact with the second panel 12b, and the second heat shield strip 16c is free of contact with the first panel 12a. In an alternative embodiment, the first and second heat shield strips 16a, 16c may be attached together or formed from a unitary piece of material.

A frangible fastener 52a–b is used to secure the heat shield strips 16a, 16c to the inflatable region 18a–b of each panel 12. As illustrated, a first frangible fastener 52a secures the first heat shield strip 16a to the inflatable region 18a of the first panel 12a, and a second frangible fastener 52b secures the second heat shield strip 16c to the inflatable region 18b of the second panel 12b. The frangible fasteners 52 may be embodied as a set of frangible stitches 52. In one embodiment, the set of frangible stitches 52 has less than 25 stitches per 100 mm and/or has thread no greater than thread size 92. Of course, alternative types of frangible fasteners 52 may be used, such as weak adhesives, clips, or pins.

The frangible fastener 52 is designed to break upon the application of a predetermined force. Thus, the frangible fastener 52 will break rather than applying force or pressure to the inflatable regions 18 of the panels 12 during inflation of the cushion 10. If a secure fastener 46, 48 were used to secure the heat shield strips 16 to the inflatable regions 18 of the cushion 10, force could be applied to the inflatable regions 18 during inflation of the cushion 10, which may result in combing or damage to the panels 12. Thus, the use of frangible fasteners 52 in the present invention provides substantial advantages over the prior art in that the heat shield strips 16 are held in place with minimal risk of damage to the panels 12.

In an alternative embodiment of the present invention, the first or second heat shield 16a, 16c may be omitted. In such an embodiment, a heat shield strip 16 is disposed over a portion of the inflatable and attachment regions 18, 22 of a single panel 12. A secure fastener 46 secures the attachment regions 22 of the first and second panels 12a–b together and also secures a heat shield strip 16 to the interior surface 34 of the attachment region 22 of the panel 12 on which it is disposed. Using a frangible fastener 52, the heat shield strip 16 is secured to the inflatable region 18 of the panel 12 on which it is positioned.

In one embodiment, a length 66 of the heat shield strip 16a between the first secure fastener 46a and the frangible fastener 52a is greater than a length 68 of the panel 12a between the first secure fastener 46a and the frangible fastener 52a. As a result, there is slack 70 in the heat shield strip 16a, which decreases the likelihood that pressure will be applied to the inflatable region 18a of the panel 12a during the inflation process.

The inflatable cushion 10 of the present invention is made in the following manner. The first heat shield strip 16a is secured to the interior surface 34a of the inflatable region 18a of the first panel 12a using a first frangible fastener 52a. The second heat shield strip 16c is optionally secured to the interior surface 34b of the inflatable region 18b of the second panel 12b using a second frangible fastener 52b. This process is repeated for each heat shield strip 16 in use in the cushion 10.

Using the secure fastener 46, the attachment region 22a of the first panel 12a and the attachment region 22b of the second panel 12b are secured between the first and second heat shield strips 16a, 16c and each set of heat shield strips 16 in use in the cushion. Attaching the first and second panels 12a–b together is more easily performed when the cushion is in an inside out configuration. Accordingly, following this attachment process, the cushion 10 may be pulled through the opening 40 (shown in FIG. 1) to invert the cushion 10 to its correct orientation.

FIG. 5 is an enlarged sectional view of the heat shield strip 16a of FIG. 4 taken along the line 5—5. The first secure fastener 46, which is embodied as a secure set of stitches 46, is shown disposed in the heat shield strip 16a of FIG. 5.

Although a heat shield strip 16a may be made from a number of different materials, the heat shield strip 16a shown in FIG. 5 is made from a woven fabric 72, having one or more sets of fibers 74a–b. In one embodiment, as illustrated, at least one set of fibers 74a of the woven fabric 72 is oriented at approximately a 45-degree angle 76 with respect to a longitudinal axis 78 of the first secure fastener 46. This arrangement allows maximum elongation of the heat shield strips 16 under a load and minimizes the risk that potentially damaging force will be applied to the cushion 12 (shown in FIG. 4) during the inflation process. Of course, a set of fibers 74 may be oriented at other angles 76 with respect to the longitudinal axis 78 of the secure fastener 46 within the scope of this invention, such as a 90-, 75-, 60-, or 35-degree angle 76. Alternatively, the longitudinal axis 78 may be generally parallel with a set of fibers 74 of the heat shield strip 16a.

The inflatable cushion of the present invention thus provides substantial advantages over conventional cushions. Through use of simple, inexpensive heat shield strips, key portions of the panels are protected from heat-related damage during inflation of the cushion. The heat shield strips are secured to the attachment regions of the cushion using a secure fastener and to inflatable region using a frangible fastener. As a result, the heat shield strips protect areas of the cushion adjacent to the seam from "combing" or other heat-related damage and avoid applying potentially damaging force or pressure to the inflatable region of the cushion.

The present invention may be embodied in other specific forms without departing from its structures, methods, or other essential characteristics as broadly described herein and claimed hereinafter. The described embodiments are to be considered in all respects as only illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An inflatable cushion having at least one shielded seam, comprising:

a first and a second panel, each panel having a peripheral edge, an inflatable region, and an attachment region positioned between the peripheral edge and the inflatable region, the attachment region of the first panel having an interior surface;

a heat shield strip;

a first secure fastener that secures the attachment regions of the first and second panels together and also secures the heat shield strip to the interior surface of the attachment region of the first panel; and a frangible fastener that secures the heat shield strip to the inflatable region of the first panel.

2. The inflatable cushion of claim 1, wherein the first secure fastener comprises at least one set of secure stitches.

3. The inflatable cushion of claim 1, further comprising a second secure fastener that secures only the attachment regions of the first and second panels together.

4. The inflatable cushion of claim 1, wherein the frangible fastener comprises at least one set of frangible stitches.

5. The inflatable cushion of claim 4, wherein the set of frangible stitches comprises less than 25 stitches per 100 mm.

6. The inflatable cushion of claim 4, wherein the set of frangible stitches comprises thread no greater than thread size 92.

7. The inflatable cushion of claim 1, wherein the heat shield strip is free of contact with the second panel.

8. The inflatable cushion of claim 1, wherein the heat shield strip comprises a woven fabric.

9. The inflatable cushion of claim 8 wherein at least one set of fibers of the woven fabric is oriented at approximately a 45-degree angle with respect to a longitudinal axis of the first secure fastener.

10. The inflatable cushion of claim 1, wherein the heat shield strip is selectively disposed on portions of the attachment region of the first panel.

11. The inflatable cushion of claim 1, wherein the inflatable region of the first panel comprises an interior surface, the first heat shield strip being disposed on the interior surface of the inflatable region.

12. The inflatable cushion of claim 1, wherein a length of the heat shield strip between the first secure fastener and the frangible fastener is greater than a length of the first panel between the first secure fastener and the frangible fastener.

13. An inflatable cushion having at least one shielded seam, comprising:

a first and a second panel, each panel having a peripheral edge, an inflatable region, and an attachment region positioned between the peripheral edge and the inflatable region, each attachment region having an interior surface;

a first and a second heat shield strip;

a first secure fastener that secures the attachment regions of the first and second panels between the first and second heat shield strips, the first heat shield strip being disposed on the interior surface of the attachment region of the first panel, and the second heat shield strip being disposed on the interior surface of the attachment region of the second panel;

a first frangible fastener that secures the first heat shield strip to the inflatable region of the first panel; and a second frangible fastener that secures the second heat shield strip to the inflatable region of the second panel.

14. The inflatable cushion of claim 13, wherein the first secure fastener comprises at least one set of secure stitches.

15. The inflatable cushion of claim 13, further comprising a second secure fastener that secures only the attachment regions of the first and second panels together.

16. The inflatable cushion of claim 13, wherein the first and second frangible fastener each comprise at least one set of frangible stitches.

17. The inflatable cushion of claim 16, wherein each set of frangible stitches comprises less than 25 stitches per 100 mm.

18. The inflatable cushion of claim 16, wherein each set of frangible stitches comprises thread no greater than thread size 92.

19. The inflatable cushion of claim 13, wherein the first heat shield strip is free of contact with the second panel, and the second heat shield strip is free of contact with the first panel.

20. The inflatable cushion of claim 13, wherein the first and second heat shield strips comprise a woven fabric.

21. The inflatable cushion of claim 13, wherein the first and second heat shield strips are selectively disposed on portions of the attachment regions of the first and second panels.

22. The inflatable cushion of claim 13, wherein the inflatable region of each panel comprises an interior surface, the first heat shield strip being disposed on the interior surface of the inflatable region of the first panel, and the second heat shield strip being disposed on the interior surface of the inflatable region of the second panel.

23. An inflatable cushion having at least one shielded seam, comprising:

a first and a second panel, each panel having a peripheral edge, an inflatable region, and an attachment region positioned between the peripheral edge and the inflatable region, the attachment region of the first panel having an interior surface, the first and second panels being made from a fabric that is devoid of a heat resistant coating;

a heat shield strip;

a first secure fastener that secures the attachment regions of the first and second panel together and also secures the heat shield strip to the interior surface of the attachment region of the first panel; and a frangible fastener that secures the heat shield strip to the inflatable region of the first panel.

24. The inflatable cushion of claim 23, wherein the first secure fastener comprises at least one set of secure stitches.

25. The inflatable cushion of claim 23, further comprising a second secure fastener that secures only the attachment regions of the first and second panels together.

26. The inflatable cushion of claim 23, wherein the frangible fastener comprises at least one set of frangible stitches.

27. The inflatable cushion of claim 26, wherein the set of frangible stitches comprises less than 25 stitches per 100 mm.

28. The inflatable cushion of claim 26, wherein the set of frangible stitches comprises thread no greater than thread size 92.

29. The inflatable cushion of claim 23, wherein the heat shield strip is free of contact with the second panel.

30. The inflatable cushion of claim 23, wherein the heat shield strip comprises a woven fabric.

31. The inflatable cushion of claim 23, wherein the inflatable region of the first panel comprises an interior surface, the first heat shield strip being disposed on the interior surface of the inflatable region.

32. A method of manufacturing an inflatable cushion having at least one shielded seam, comprising:
- securing a first heat shield strip to an interior surface of an inflatable region of a panel using a first frangible fastener;
- securing a second heat shield strip to an interior surface of an inflatable region of a second panel using a second frangible fastener; and
- securing an attachment region of the first panel and an attachment region of the second panel between the first and second heat shield strips using a secure fastener, the first heat shield strip being disposed on an interior surface of the attachment region of the first panel, and the second heat shield strip being disposed on an interior surface of the attachment region of the second panel.

33. An inflatable cushion having at least one shielded seam, comprising:
- a first and a second panel, each panel having a peripheral edge, an inflatable region, and an attachment region positioned between the peripheral edge and the inflatable region, the attachment region of the first panel having an interior surface;
- a heat shield means;
- a secure fastener means that secures the attachment regions of the first and second panels together and also secures the heat shield means to the interior surface of the attachment region of the first panel; and
- a frangible fastener means that secures the heat shield means to the inflatable region of the first panel.

* * * * *